US011733956B2

(12) United States Patent
Sommer et al.

(10) Patent No.: US 11,733,956 B2
(45) Date of Patent: Aug. 22, 2023

(54) DISPLAY DEVICE SHARING AND INTERACTIVITY

(71) Applicant: Apple Inc., Cupertino, CA (US)

(72) Inventors: Bruno M. Sommer, Sunnyvale, CA (US); Alexandre Da Veiga, San Francisco, CA (US); Ioana Negoita, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/266,912

(22) PCT Filed: Sep. 3, 2019

(86) PCT No.: PCT/US2019/049287
§ 371 (c)(1),
(2) Date: Feb. 8, 2021

(87) PCT Pub. No.: WO2020/051111
PCT Pub. Date: Mar. 12, 2020

(65) Prior Publication Data
US 2021/0349676 A1 Nov. 11, 2021

Related U.S. Application Data

(60) Provisional application No. 62/726,903, filed on Sep. 4, 2018.

(51) Int. Cl.
*G06F 3/16* (2006.01)
*G06F 3/14* (2006.01)
(Continued)

(52) U.S. Cl.
CPC ............ *G06F 3/1454* (2013.01); *G06F 3/011* (2013.01); *G06F 3/017* (2013.01); *G06F 3/04815* (2013.01)

(58) Field of Classification Search
None
See application file for complete search history.

(56) References Cited

U.S. PATENT DOCUMENTS

| 5,594,469 A | * | 1/1997 | Freeman | ................. G06F 3/017 345/158 |
| 6,545,663 B1 | * | 4/2003 | Arbter | .................. G06F 3/0425 345/156 |

(Continued)

FOREIGN PATENT DOCUMENTS

| EP | 2242240 A1 | 10/2010 |
| WO | 2017/100753 A1 | 6/2017 |
| WO | 2018/071190 A1 | 4/2018 |

OTHER PUBLICATIONS

International Search Report and Written Opinion dated Dec. 3, 2019, International Application No. PCT/US2019/049287, pp. 1-11.

(Continued)

*Primary Examiner* — Jordany Nunez
(74) *Attorney, Agent, or Firm* — Fernando & Partners, LLP

(57) ABSTRACT

In one implementation, a method of providing display device sharing and interactivity in simulated reality is performed at a first electronic device including one or more processors and a non-transitory memory. The method includes obtaining a gesture input to a first display device in communication with the first electronic device from a first user, where the first display device includes a first display. The method further includes transmitting a representation of the first display to a second electronic device in response to obtaining the gesture input. The method additionally includes receiving an input message directed to the first display device from the second electronic device, where the input message includes an input directive obtained by the second electronic device from a second user. The method (Continued)

also includes transmitting the input message to the first display device for execution by the first display device.

26 Claims, 13 Drawing Sheets

(51) Int. Cl.
*G06F 3/01* (2006.01)
*G06F 3/04815* (2022.01)

(56) References Cited

U.S. PATENT DOCUMENTS

| | | | | |
|---|---|---|---|---|
| 9,047,698 | B2* | 6/2015 | Maciocci | G06F 3/167 |
| 9,142,062 | B2* | 9/2015 | Maciocci | G06T 15/503 |
| 9,978,178 | B1* | 5/2018 | Shepard | G06F 3/00 |
| 10,062,208 | B2* | 8/2018 | Ziman | G06F 3/011 |
| 10,390,171 | B2* | 8/2019 | Lee | G06F 3/012 |
| 10,999,412 | B2* | 5/2021 | Leppanen | G06F 3/011 |
| 11,140,448 | B2* | 10/2021 | Meredith | H04N 21/2668 |
| 11,196,964 | B2* | 12/2021 | Yerli | G06T 17/10 |
| 2010/0295921 | A1* | 11/2010 | Guthrie | G06T 19/00 348/14.08 |
| 2012/0210254 | A1* | 8/2012 | Fukuchi | G06F 3/012 715/757 |
| 2012/0320158 | A1 | 12/2012 | Junuzovic et al. | |
| 2013/0002532 | A1* | 1/2013 | Raffle | G06F 3/1423 345/156 |
| 2014/0063061 | A1* | 3/2014 | Reitan | G09G 3/003 345/633 |
| 2015/0169069 | A1 | 6/2015 | Lo et al. | |
| 2016/0300387 | A1* | 10/2016 | Ziman | G06F 3/147 |
| 2017/0039770 | A1* | 2/2017 | Lanier | G06T 19/006 |
| 2017/0053446 | A1* | 2/2017 | Chen | G06T 19/20 |
| 2017/0068322 | A1* | 3/2017 | Steinberg | G06F 3/005 |
| 2017/0262045 | A1* | 9/2017 | Rouvinez | G06F 3/011 |
| 2017/0262245 | A1* | 9/2017 | Yoganandan | G06F 3/1438 |
| 2017/0262247 | A1* | 9/2017 | Yoganandan | H04N 19/70 |
| 2018/0032299 | A1* | 2/2018 | Liu | H04W 76/11 |
| 2018/0061132 | A1* | 3/2018 | Lanier | G06F 3/013 |
| 2018/0075657 | A1* | 3/2018 | Lanier | G06F 3/04845 |
| 2018/0096519 | A1* | 4/2018 | Tokubo | A63F 13/211 |
| 2018/0173323 | A1* | 6/2018 | Harvey | G06F 3/038 |
| 2018/0219975 | A1* | 8/2018 | Leppanen | H04L 67/38 |
| 2019/0081993 | A1* | 3/2019 | Shim | G06F 3/1423 |
| 2019/0208210 | A1* | 7/2019 | Trepte | H04N 19/137 |
| 2020/0357157 | A1* | 11/2020 | Edwards | G06K 9/6256 |
| 2021/0327140 | A1* | 10/2021 | Rothkopf | G06F 3/017 |

OTHER PUBLICATIONS

Bang, Jun Sung, et al. "Trends in Remote Collaboration Technology for Virtual and Augmented Reality." Electronics and Telecommunications Trends 32.6 (2017): 96-104.
KIPO Notice of Preliminary Rejection dated Jun. 24, 2022, Korean Application No. 10-2021-7006665, pp. 1-8.

* cited by examiner

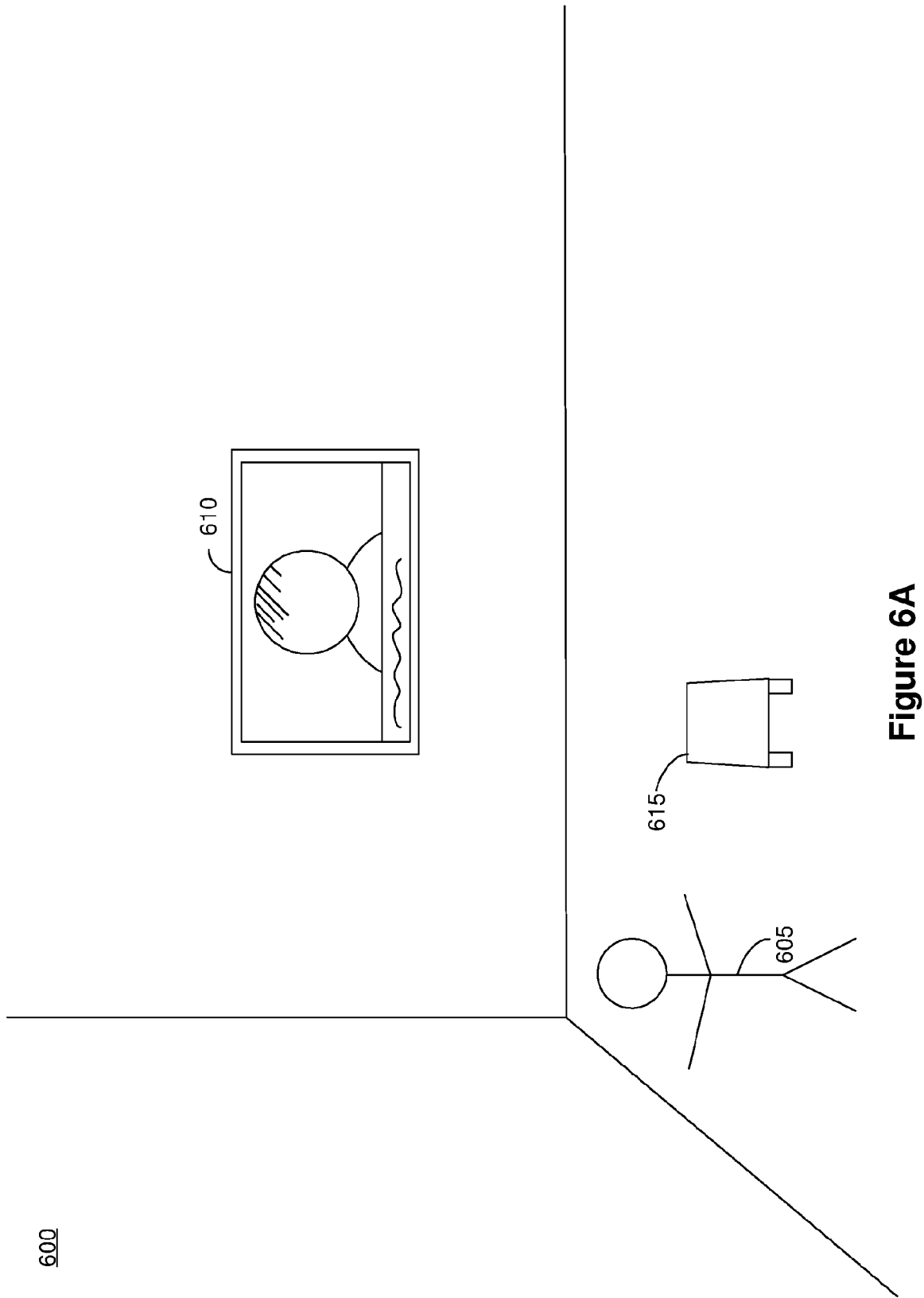

DISPLAY DEVICE SHARING AND INTERACTIVITY

CROSS-REFERENCES TO RELATED APPLICATIONS

This application is the national phase entry of Intl. Patent App. No. PCT/US2019/049287, filed on Sep. 3, 2019, which claims priority to U.S. Provisional Patent App. No. 62/726,903, which are both hereby incorporated by reference in their entireties.

TECHNICAL FIELD

The present disclosure generally relates to simulated reality applications on multifunction devices.

BACKGROUND

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Thus, SR technology provides an interactive setting for users in a shared space. However, sharing of real-world computing devices, such as smart-phones, tablets, laptops, PC screens, etc., was previously unavailable in SR systems.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 6A-6D are diagrams of scaling an SR representation of a display device in an exemplary SR setting in accordance with some implementations.

Figure 1A:
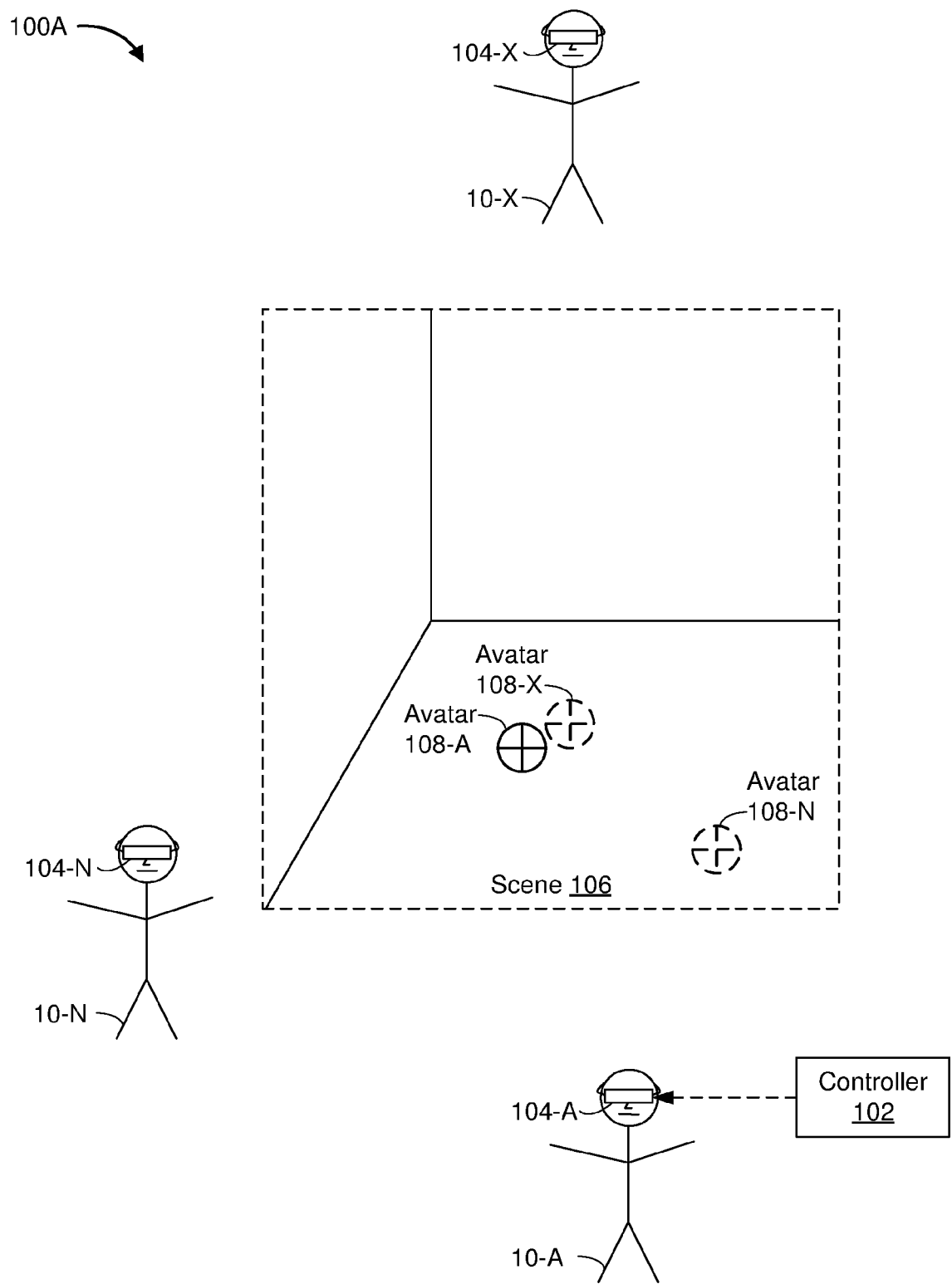
FIGS. 1A and 1B are diagrams of example settings in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for sharing a real-world device in a simulated reality (SR) setting between users. In various implementations, the method is performed at a first SR device including one or more processors and a non-transitory memory. The method includes obtaining a gesture input to a first display device from a first user, wherein the first display device includes a first display, and the first display device is in communication with the first SR device. The method further includes transmitting a representation of the first display to a second SR device in response to obtaining the gesture input. The method additionally includes receiving an input message directed to the first display device from the second SR device, wherein the input message includes an input directive obtained by the second SR device from a second user. The method also includes transmitting the input message to the first display device for execution by the first display device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Various implementations disclosed herein provide a display device sharing experience in a shared simulated reality (SR) setting. In some implementations, the display device has a display and is in communication with a first SR device used by a first user. For instance, the first user wears a head mounted device (HMD) and holds a smartphone in his hand, where through wired or wireless connection in communications range, the HMD and the smartphone are paired. When the first user provides a gesture input associated with the display device, e.g., moving or tilting the smartphone towards a second user, the second user is provided with an SR representation of the display device, e.g., projecting the display of the display device on a wall viewable by the second user, displaying the user interface of the display device in a TV in the SR setting, and/or displaying a floating panel in the SR setting representing the display device. Moreover, the second user is provided with controls of the display device, so that the second user can enter input directives to be executed on the display device. In some implementations, the input directives from the second user are obtained by the second SR device, and packaged as input messages to be transmitted to the first SR device. The first SR device then forwards the input messages to the display device for execution. For instance, in the shared SR setting, the second user can emulate receipt of the SR representation of the display device from the first user, emulate movements of the SR representation of the display device in the SR setting, emulate placing it on a surface in the SR setting, and/or emulate touch inputs to the SR representation of the display device etc. Thus, through the shared SR setting, the second user can interact with the display device and share the control and operation of the display device with the first user.

FIG. 1A illustrates an example of SR setting 100A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100A is a shared virtual space provided (e.g., available) to multiple users, e.g., user 10-A, 10-N, and 10-X, through multiple SR devices 104, e.g., SR devices 104-A, 104-N, and 104-X. In some implementations, each of the SR devices 104 is associated with a controller 102. In the example of FIG. 1A, each of the SR devices 104 is worn by a user 10, e.g., the SR device 104-A is worn by the user 10-A, the SR device 104-N is worn by the user 10-N, the SR device 104-X is worn by the user 10-X, etc.

In some implementations, each SR device 104 corresponds to a head-mountable device (HMD), tablet, mobile phone, wearable computing device, or the like. In some implementations, each SR device 104 is configured to present an SR experience to the associated user 10. In some implementations, each SR device 104 includes a suitable combination of software, firmware, and/or hardware.

According to some implementations, each SR device 104 presents an SR experience to the associated user 10 while the associated user 10 is virtually and/or physically present within a scene 106. In some implementations, a respective avatar 108 represents the user 10 in the scene 106, e.g., the avatar 108-A represents the user 10-A, the avatar 108-N represents the user 10-N, and the avatar 108-X represents the user 10-X in the scene 106.

In some implementations, while presenting an SR experience, the SR device 104 is configured to present SR content and to enable video pass-through of the scene 106 (e.g., the SR device 104 corresponds to an SR-enabled mobile phone or tablet). In some implementations, while presenting the SR experience, the SR device 104 is configured to present the SR content and to enable optical see-through of the scene 106 (e.g., the SR device 104 corresponds to an SR-enabled glasses). In some implementations, while presenting an SR experience, the SR device 104 is configured to present the SR content and to optionally enable video pass-through of the scene 106 (e.g., the SR device 104 corresponds to an SR-enabled HMD).

In some implementations, the user 10 wears the SR device 104 on his/her head (e.g., as shown in FIG. 1A). As such, the SR device 104 includes one or more SR displays provided to display the SR content. For example, the SR device 104-A encloses the field-of-view of the user 10-A, the SR device 104-N encloses the field-of-view of the user 10-N, and the SR device 104-X encloses the field-of-view of the user 10-X. In some implementations, the SR device 104 is replaced with an SR chamber, enclosure, or room configured to present SR content, in which the user 10 does not wear the SR device 104. In some implementations, the user 10 holds the SR device 104 in his/her hand(s) and views at least part of the scene 106 through the display associated with the SR device 104.

In some implementations, the controller 102 is configured to manage and coordinate an SR experience for the user 10. In some implementations, the controller 102 includes a suitable combination of software, firmware, and/or hardware. In some implementations, the controller 102 is a computing device that is local or remote relative to the scene 106. For example, the controller 102 is a local server located within the scene 106. In another example, the controller 102 is a remote server located outside of the scene 106 (e.g., a cloud server, central server, etc.). In some implementations, the controller 102 is communicatively coupled with the SR device 104 via one or more wired or wireless communication channels (e.g., BLUETOOTH, IEEE 802.11x, IEEE 802.16x, IEEE 802.3x, etc.). In some implementations, through the one or more wired or wireless communication channels, the SR devices 104 communicate with each other. In some implementations, the functionalities of the controller 102 are provided by and/or combined with the SR device 104 in order to update the scene and share the virtual space.

As illustrated in FIG. 1A, the SR device 104 presents the scene 106, which in some implementations is generated by the controller 102 and/or the SR device 104. In some implementations, the scene 106 includes a virtual scene that is a simulated replacement of a real-world scene. In other words, in some implementations, the scene 106 is simulated by the controller 102 and/or the SR device 104. In such implementations, the scene 106 is different from the real-world scene where the SR device 104 is located. In some implementations, the scene 106 includes an augmented scene that is a modified version of a real-world scene. For example, in some implementations, the controller 102 and/or the SR device 104 modify (e.g., augment) the real-world scene where the SR device 104 is located in order to generate the scene 106. In some implementations, the controller 102 and/or the SR device 104 generate the scene 106 by simulating a replica of the real-world scene where the SR device 104 is located. In some implementations, the controller 102 and/or the SR device 104 generate the scene 106 by removing and/or adding items from the simulated replica of the real-world scene where the SR device 104 is located. In other words, in some implementations, the controller 102 and/or the SR device 104 facilitate the generation of an SR that includes a mixture of virtual content and content from a real-world scene.

Figure 1B:
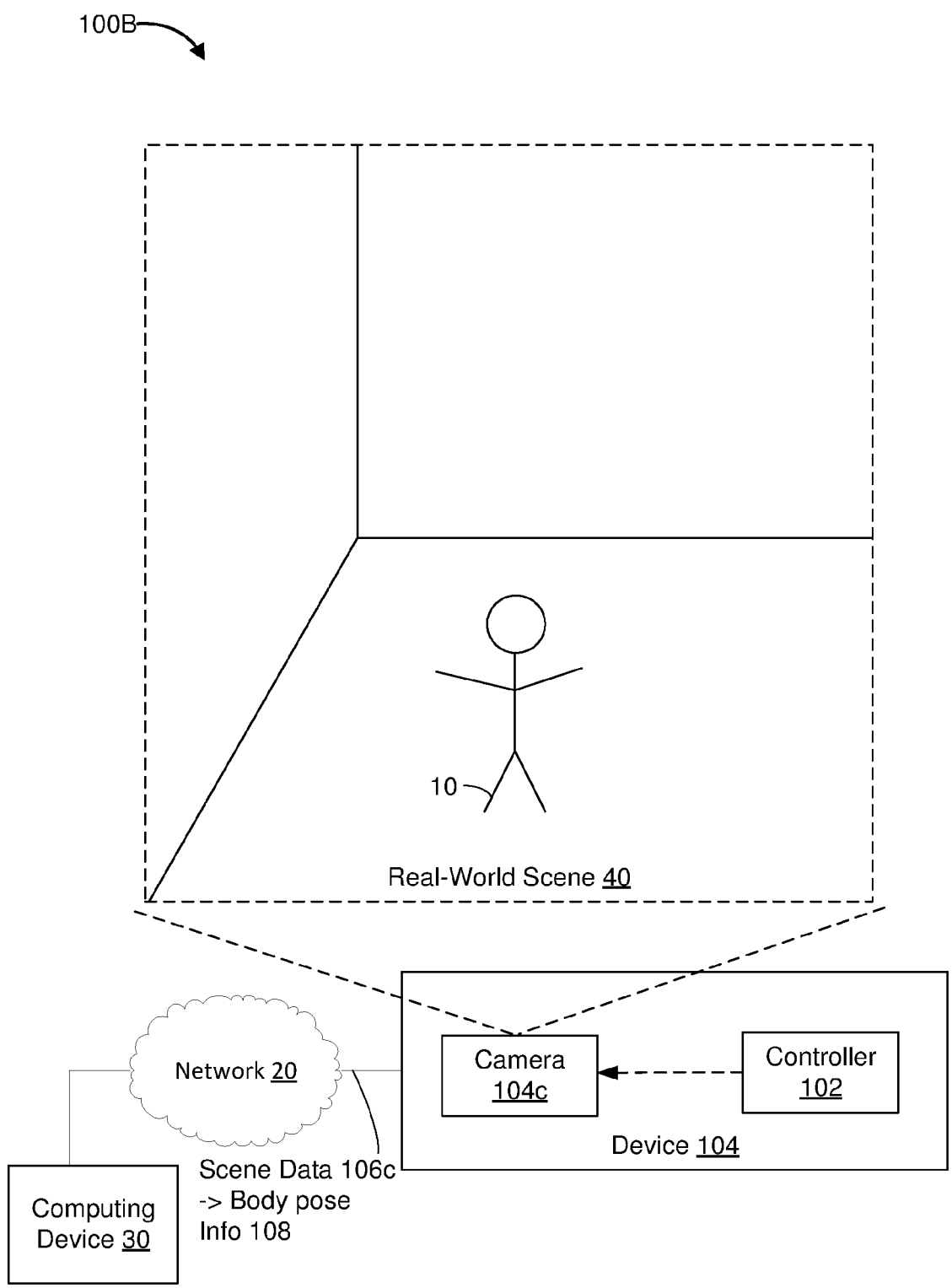

Referring to FIG. 1B, FIG. 1B is a diagram of an example operating environment 100B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100B includes a network 20, a computing device 30, a real-world scene 40, and a device 104.

In the example of FIG. 1B, the real-world scene 40 includes a person 10. In various implementations, the device 104 captures a set of images of the scene 40 and transmits the scene data 106c (e.g., for generating the scene data 106 in FIG. 1A) to the computing device 30 over the network 20. In some implementations, the device 104 includes the controller 102 and a camera 104c. In some implementations, the camera 104c captures the set of images, and the controller 102 generates the scene data 106c based on the set of images. In some implementations, the scene data 106c includes body pose information 108 for the person 10 that is in a field of view of the camera 104c.

In various implementations, the body pose information 108 indicates body poses of the person 10 that is in the field of view of the camera 104c. For example, in some implementations, the body pose information 108 indicates joint positions and/or joint orientations of the person 10 (e.g., positions/orientations of shoulder joints, elbow joints, wrist joints, pelvic joint, knee joints, and ankle joints). In some implementations, the body pose information 108 indicates positions/orientations of various body portions of the person 10 (e.g., positions/orientations of head, torso, upper arms, lower arms, upper legs, and lower legs).

In various implementations, transmitting the body pose information 108 over the network 20 consumes less bandwidth than transmitting images captured by the camera 104c. In some implementations, the device 104 has access to an available amount of bandwidth. In such implementations, transmitting the body pose information 108 consumes less than the available amount of bandwidth, whereas transmitting images captured by the camera 104c may consume more than the available amount of bandwidth. In various implementations, transmitting the body pose information 108 (e.g., instead of transmitting images) improves the operability of the network 20, for example, by utilizing less network resources (e.g., by utilizing less bandwidth).

In some implementations, the computing device 30 utilizes the body pose information 108 in order to render an avatar of the person 10. For example, in some implementations, the computing device 30 provides the body pose information 108 to a display engine (e.g., a rendering and display pipeline) that utilizes the body pose information 108 in order to render the avatar in a virtual scene. Since the computing device 30 utilizes the body pose information 108 in order to render the avatars, the body pose of the avatars is within a degree of similarity to the body pose of the person 10 at the real-world scene 40. As such, viewing the avatar in the virtual scene is within a degree of similarity to viewing the images of the real-world scene 40.

Figure 2:
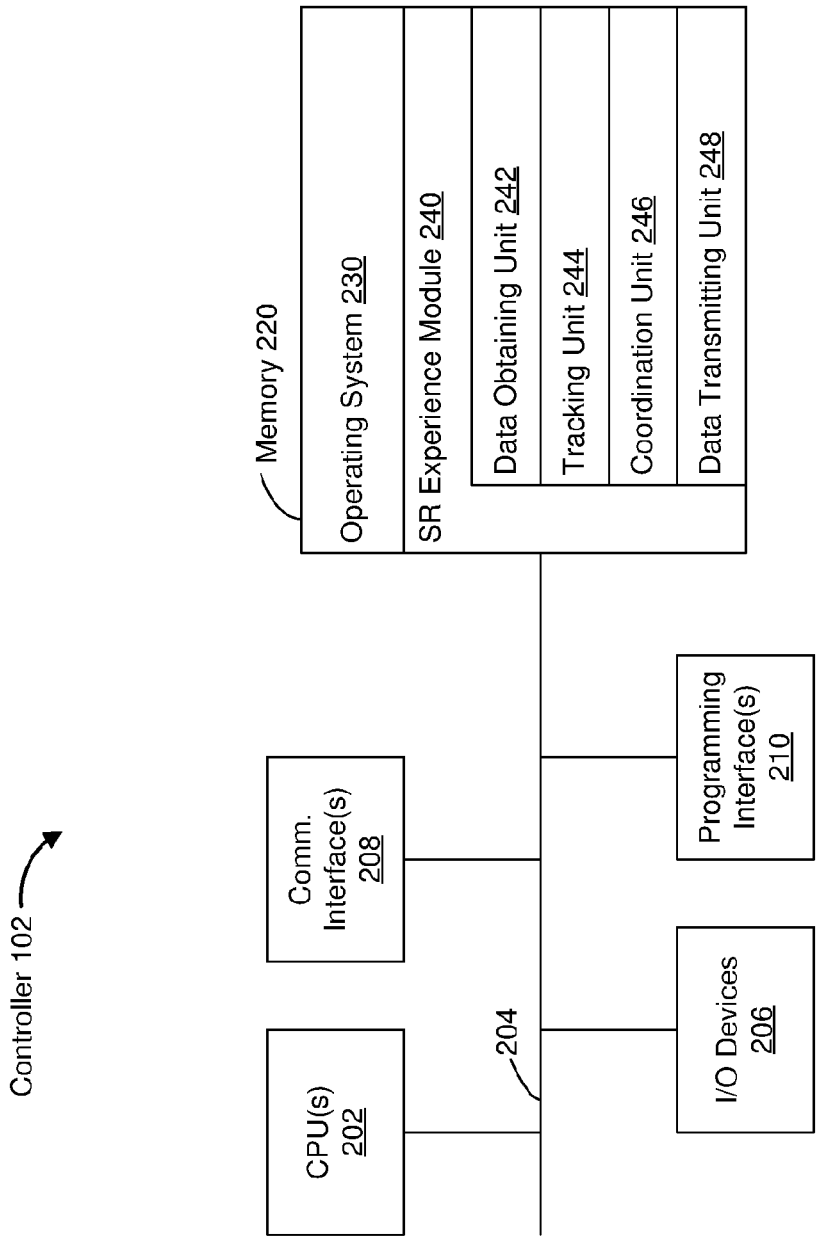
FIG. 2 is a block diagram of an example controller in accordance with some implementations.

FIG. 2 is a block diagram of an example of the controller 102 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 102 includes one or more processing units 202 (e.g., microprocessors, application-specific integrated-circuits (ASICs), field-programmable gate arrays (FPGAs), graphics processing units (CPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an SR experience module 240.

The operating system 230 includes procedures for handling various basic system services and for performing hardware dependent tasks. In some implementations, the SR experience module 240 is configured to manage and coordinate one or more SR experiences for one or more users (e.g., a single SR experience for one or more users, or multiple SR experiences for respective groups of one or more users). To that end, in various implementations, the SR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 104. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 104 with respect to the scene 106 (FIG. 1A). In some implementations, the tracking unit 244 is configured to track the hand, arm, eye position/location of the user with respect to the scene 106 (FIG. 1A), so as to derive interaction of the user with other elements in the scene 106. To that end, in various implementations, the tracking unit 244 includes instructions and/or logic therefor, and heuristics and metadata therefor.

In some implementations, the coordination unit 246 is configured to manage and coordinate the SR experience presented to the user by the HMD 104. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 104. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 102), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
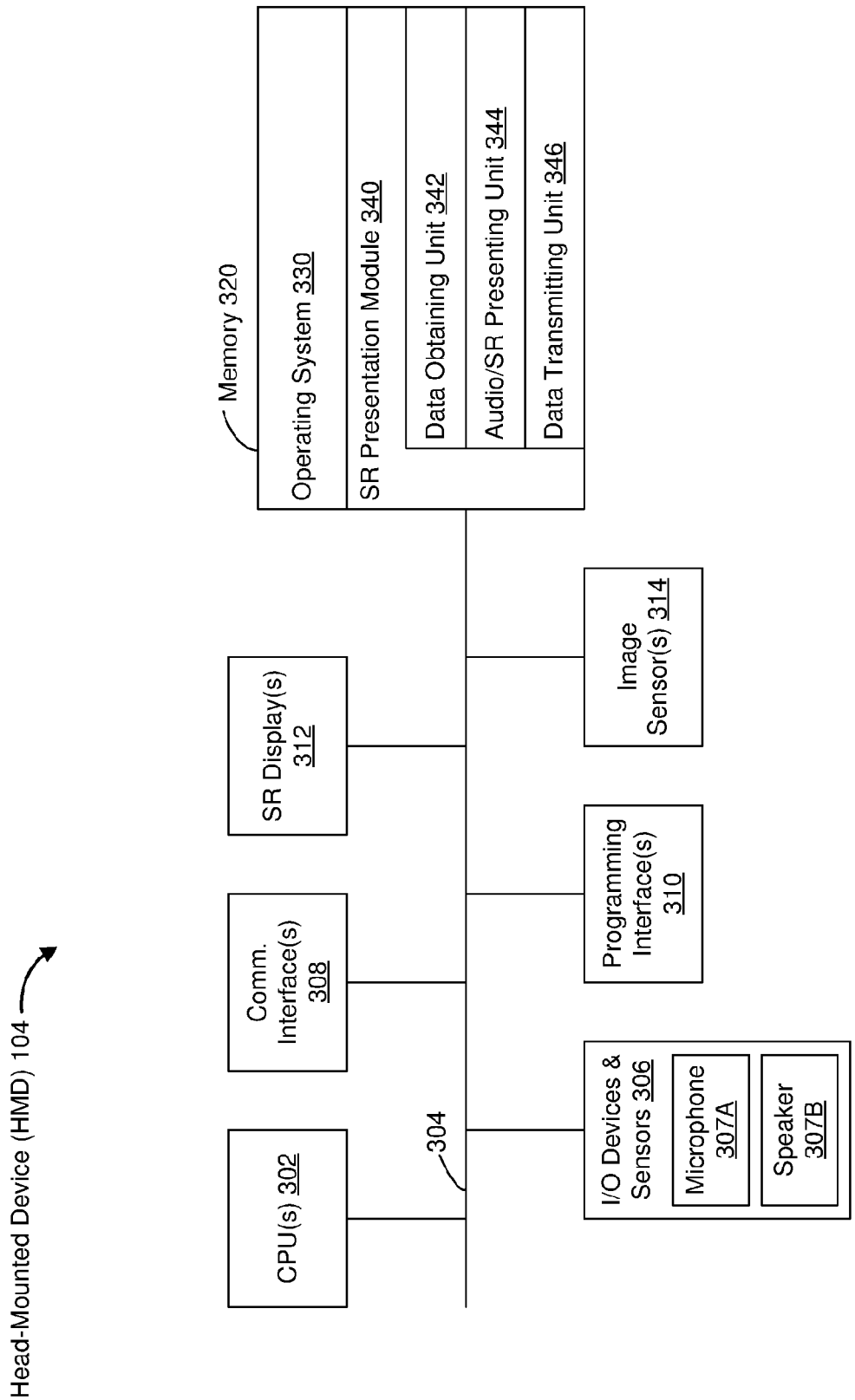
FIG. 3 is a block diagram of an example head-mounted device (HMD) in accordance with some implementations.

FIG. 3 is a block diagram of an example of an SR device 104 (e.g., an HMD 104) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 104 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more SR displays 312, one or more interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 307A, one or more speakers 307B (e.g., headphones or loudspeakers), a haptics engine, one or more depth sensors (e.g., a structured light, a time-of-flight, or the like), and/or the like.

In some implementations, the one or more SR displays 312 are configured to provide the SR experience to the user. In some implementations, the one or more SR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more SR displays 312 correspond to diffractive, reflective, polarized, holographic, etc. waveguide displays. For example, the HMD 104 includes a single SR display. In another example, the HMD 104 includes an SR display for each eye of the user. In some implementations, the one or more SR displays 312 are capable of presenting SR content.

In some implementations, the one or more image sensors 314 are configured to obtain image data that corresponds to at least a portion of the face of the user that includes the eyes of the user (and may be referred to as an eye-tracking camera). In some implementations, the one or more image sensors 314 are configured to obtain image data that corresponds to at least a portion of the hand of the user that includes the fingers of the user (and may be referred to as a hand-tracking camera). In some implementations, the one or more image sensors 314 are configured to be forward-facing so as to obtain image data that corresponds to the scene as would be viewed by the user if the HMD 104 was not present (and may be referred to as a scene camera). The one or more image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an SR presentation module 340.

The operating system 330 includes procedures for handling various basic system services and for performing hardware dependent tasks. In some implementations, the SR presentation module 340 is configured to present SR content to the user via the one or more SR displays 312. To that end, in various implementations, the SR presentation module 340 includes a data obtaining unit 342, an audio/SR presenting unit 344, and a data transmitting unit 346.

In some implementations, the data obtaining unit 342 is configured to obtain data (e.g., presentation data, interaction data, sensor data, location data, etc.) from one or more of the controller 102 (e.g., via the communication interface 308), the I/O devices and sensors 306, or the one or more image sensors 314. To that end, in various implementations, the data obtaining unit 342 includes instructions and/or logic therefor, and heuristics and metadata therefor.

In some implementations, the audio/SR presenting unit 344 is configured to present an audio/SR experience via the one or more SR displays 312 (and, in various implementations, the speaker 307B and/or microphone 307A). To that end, in various implementations, the SR presenting unit 344 includes instructions and/or logic therefor, and heuristics and metadata therefor.

In some implementations, the data transmitting unit 346 is configured to transmit data (e.g., presentation data, location data, etc.) to at least the controller 102. To that end, in various implementations, the data transmitting unit 346 includes instructions and/or logic therefor, and heuristics and metadata therefor.

Although the data obtaining unit 342, the audio/SR presenting unit 344, and the data transmitting unit 346 are shown as residing on a single device (e.g., the HMD 104), it should be understood that in other implementations, any combination of the data obtaining unit 342, the audio/SR presenting unit 344, and the data transmitting unit 346 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
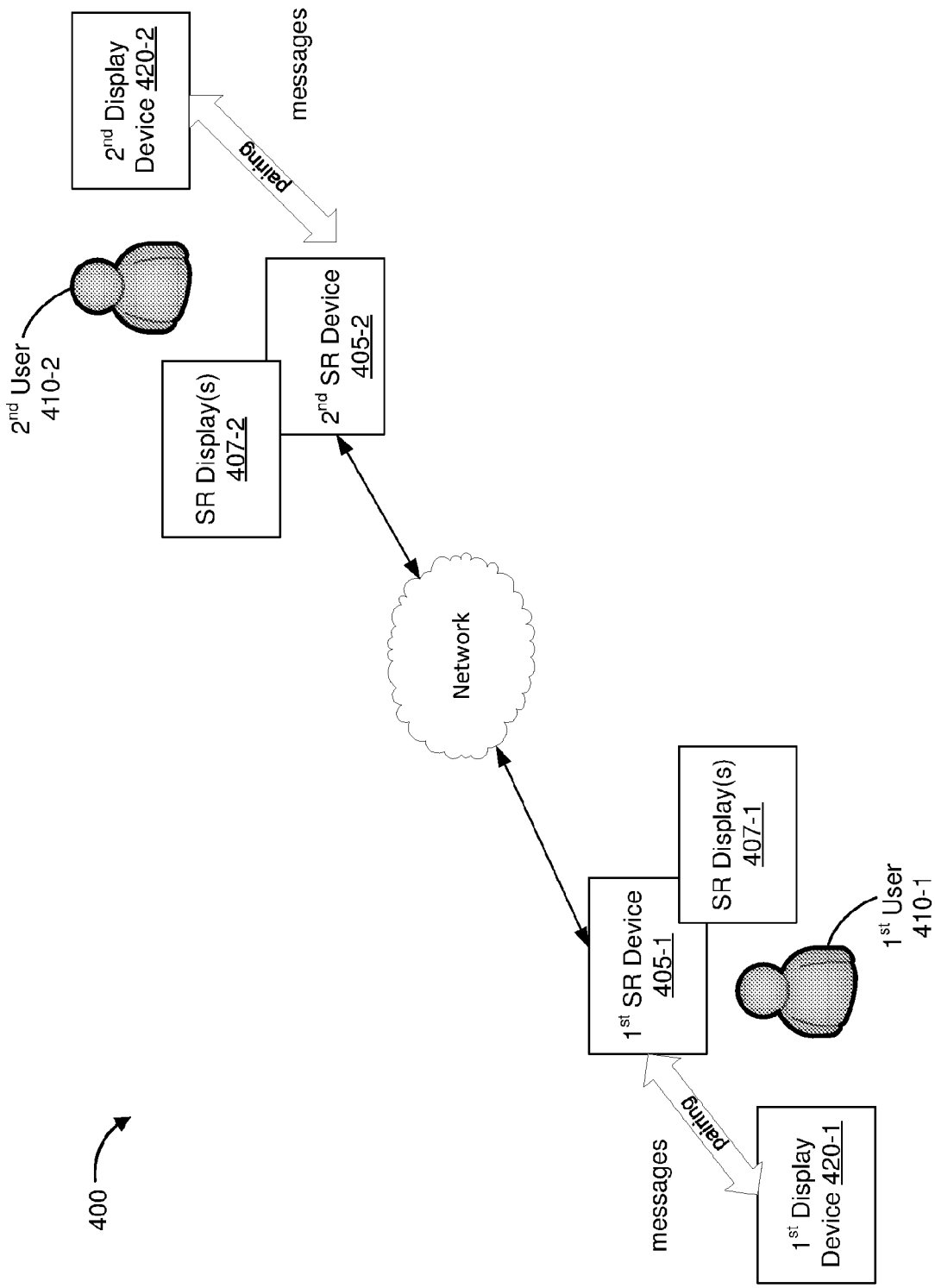
FIG. 4 is a block diagram illustrating display device sharing in an exemplary operating environment in accordance with some implementations.

FIG. 4 illustrates display device sharing in an operating environment 400 in accordance with some implementations. The operating environment 400 provides a shared SR space for a first user 410-1 and a second user 410-2. In order to provide the shared SR space for display device sharing and interactivity, a first SR device 405-1 used by the first user 410-1 is associated with one or more SR displays 407-1. Likewise, a second SR device 405-2 used by the second user 410-2 is associated with one or more SR displays 407-2. Further, the first SR device 405-1 and the second SR device 405-2 are connected through a network (e.g., peer-to-peer connection).

As shown in FIG. 4, in addition to using the first SR device 405-1 (e.g., wearing an HMD or using a smartphone as an SR device), the first user 410-1 is also associated with a first display device 420-1, e.g., holding the first display device 420-1. As such, the first SR device 405-1 and the first display device 420-1 are local to the first user 410-1 and remote to the second user 410-2. In a similar vein, in addition to using the second SR device 405-2 (e.g., wearing an HMD or using a smartphone as an SR device), the second user 410-2 is also associated with a second display device 420-2, e.g., using and holding the second display device 420-2. As such, the second SR device 405-2 and the second display device 420-2 are local to the second user 410-2 and remote to the first user 410-1.

In some implementations, the first SR device 405-1 is paired with the first display device 420-1. Through the pairing to the first display device 420-1, the first SR device 405-1 obtains an SR representation of the first display device 420-1 and transmits the SR representation of the first display device 420-1 to the second SR device 405-2 for rendering in the shared SR space. Likewise, in some implementations, the second SR device 405-2 is paired with the second display device 420-2. Through the pairing to the second display device 420-2, the second SR device 405-2 obtains an SR representation of the second display device 420-2 and transmits the SR representation of the second display device 420-2 to the first SR device 405-1 for rendering in the shared SR setting. In some implementations, the pairing is through wired and/or wireless connection.

In some implementations, utilizing the IMU and/or cameras of the first SR device 405-1, the first SR device 405-1 obtains hand tracking, body poses, and/or movements of the first user 410-1; and utilizing the IMU and/or cameras of the second SR device 405-2, the second SR device 405-2 obtains hand tracking, body poses, and/or movements of the second user 410-1. The hand gestures, body poses and/or movements of the respective user 410 are gesture inputs and indicate whether the respective user 410 intents to enter a collaboration mode. In some implementations, the first display device 420-1, the second display device 420-2, the first SR device 405-1, and/or the second SR device 405-2 include cameras, hand tracking, and/or IMU for detecting the gesture inputs. In some implementations, the gesture inputs are detected by the respective SR device 405. In some implementations, the gesture inputs are detected by the respective display device 420 and transmitted to the paired SR device 405 through the respective pairing.

In some implementations, in addition to detecting the gesture inputs, the first display device 420-1, the second display device 420-2, the first SR device 405-1, and/or the second SR device 405-2 also receives input directives directed at the first display device 420-1 and/or the second display device 420-2. For example, the first display device 420-1 obtains input directives from the first user 410-1. The input directives from the first user 410-1 are directed to manipulations of the second display device 420-2 in the SR environment, e.g., touching, toggling, voice commands, and/or movements directed at a representation of the second display device 420-2 in the SR setting. The input directives are packaged as the input messages and sent to the second SR device 405-2 over the network. The second SR device 405-2 then forwards the input messages to the second display device 420-2 through its pairing to the second display device 420-2 for local execution by the second display device 420-2. In another example, the second display device 420-2 obtains input directives from the second user 410-2. The input directives from the second user 410-2 are directed to manipulations of the first display device 420-1 in the SR setting, e.g., touching, toggling, voice commands, and/or movements directed at a representation of the first display device 420-1 in the SR setting. The input directives are packaged as the input messages and sent to the first SR device 405-1 over the network. The first SR device 405-1 then forwards the input messages to the first display device 420-1 through its pairing to the first display device 420-1 for local execution by the first display device 420-1.

Though FIG. 4 illustrates the first display device 420-1, the first SR device 405-1, and the SR display(s) 407-1 as separate components, in some implementations, the first display device 420-1, the first SR device 405-1, and/or the SR display(s) 407-1 are integrated. Likewise, though FIG. 4 illustrates the second display device 420-2, the second SR device 405-2, and the SR display(s) 407-2 as separate components, in some implementations, the second display device 420-2, the second SR device 405-2, and/or the SR display(s) 407-2 are integrated. For example, a smartphone with a touch screen display can be used as both an SR device and as a display device to be shared with a remote user.

Figure 5A:
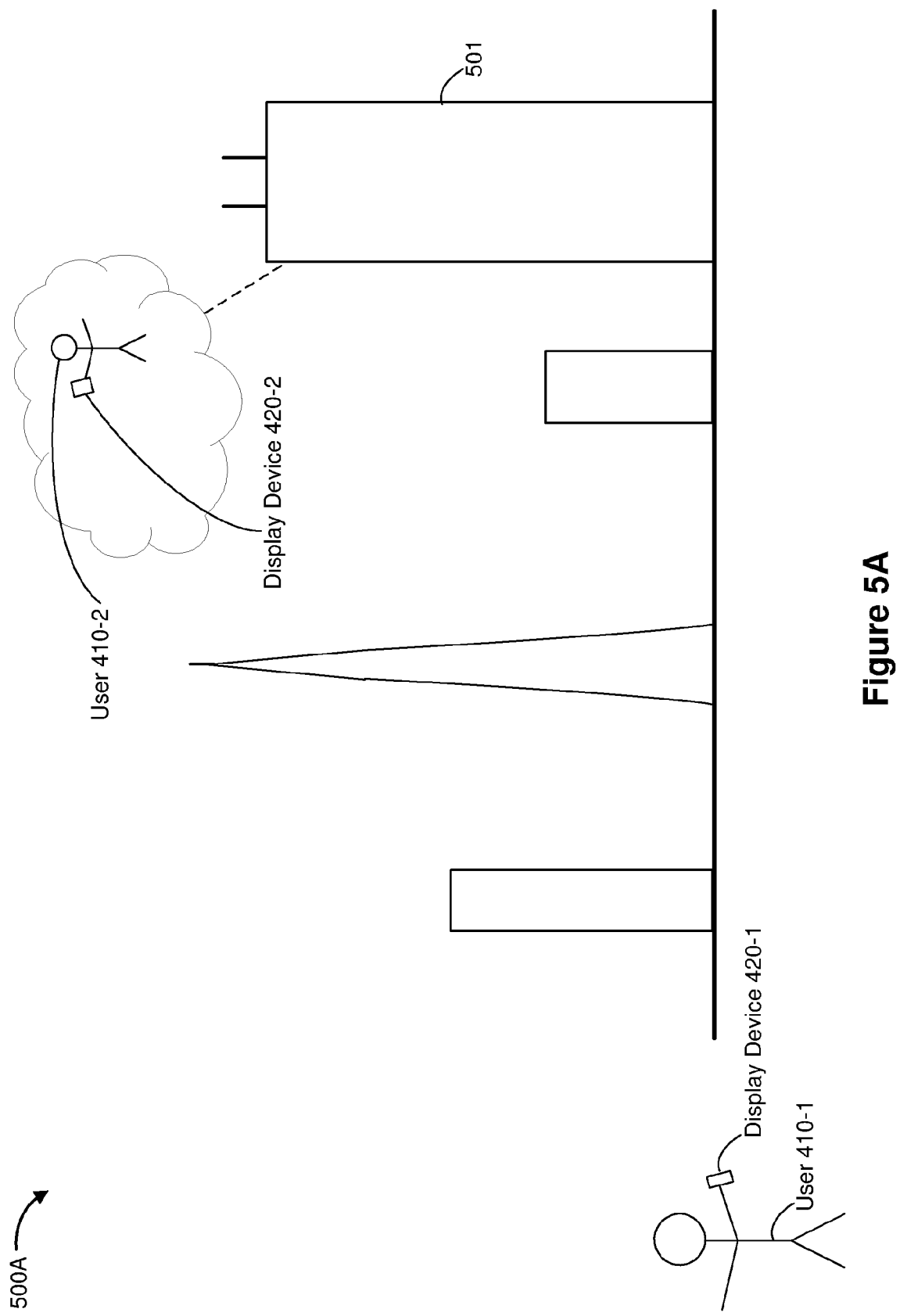
FIGS. 5A-5E are diagrams of example settings in which display device sharing is triggered in accordance with some implementations.

FIGS. 5A-5E are diagrams of examples of SR settings 500A-500E for device sharing in accordance with some implementations. In the example of SR setting 500A, as shown in FIG. 5A, the first user 410-1 walks along a street and holds the first display device 420-1 (e.g., a smartphone)

in his hand. In the example of SR setting 500A, there are also several buildings 501 in the distance. Inside one of the buildings 501, the second user 410-2 holds the second display device 420-2 (e.g., a tablet computer). In some implementations, the first display device 420-1 and the second display device 420-2 are computing devices, e.g., real-world physical devices, such as smartphones, tablets, laptops, or PC screens etc. Each respective display device 420 includes a display (e.g., a display with a touch sensitive surface), an I/O interface, a communication interface, a non-transitory memory, and a processor to execute commands. As described above in connection with FIG. 4, in some implementations, the first user 410-1 is associated with the first SR device 405-1 and the second user 410-2 is associated with the second SR device (not shown). As such, the first SR device 405-1 and the first display device 420-1 are local to the first user 410-1 and remote to the second user 410-2. Likewise, the second SR device and the second display device 420-2 are local to the second user 410-2 and remote to the first user 410-1.

In some implementations, in response to detecting a gesture input associated with the first display device 420-1 held by the first user 410-1, the first display device 420-1 is shared between the first user 410-1 and the second user 410-2. For example, in the exemplary SR setting 500B of FIG. 5B, the first user 410-1 transitions from walking and holding the first display device 420-1 to moving the first display device 420-1 away from his body and holding the first display device 420-1 in his palm. In some implementations, the gesture input of moving the first display device 420-1 in a direction towards the other user triggers the collaboration mode. For example, in FIG. 5B, the first user 410-1 perceives the second user 410-2 (not shown) as standing in front of the first user 410-1 in the shared SR setting 500B. Accordingly, the first user 410-1 hands the first display device 420-1 in the direction towards the second user 410-2 in front of him, so that the second user 410-2 can receive, view, and/or interact with the first display device 420-1 in the shared SR setting 500B. As shown in the exemplary setting 500C of FIG. 5C, upon entering the collaboration mode, the SR setting includes an SR representation of the first display device 420-1' held by the right hand of the first user 410R-1'. The SR setting 500C further includes the left hand of the first user 410L-1' representing the first user entering a touch input (e.g., a pinch gesture) to the first display device 420-1 in the real-world. The SR setting 500C also includes a representation of the left hand of the second user 410L-2' representing the second user entering an emulated touch input (e.g., an emulated tap gesture) to the SR representation of the first display device 420-1'. As such, in spite of the physical distance between the first user 410-1 and the second user 410-2 in real-world (e.g., one walking on the street and the other in a tall building), through the SR setting 500C both the first user 410-1 and the second user 410-2 can interact with the first display device in close collaboration.

Figure 5C:
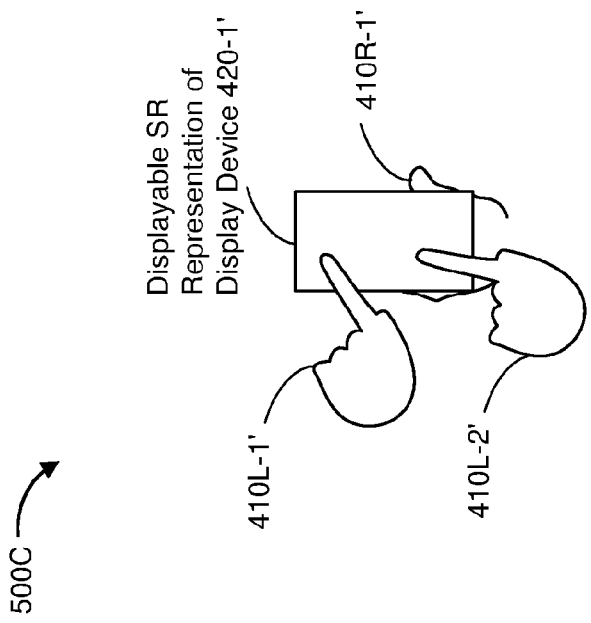
Figure 5B:
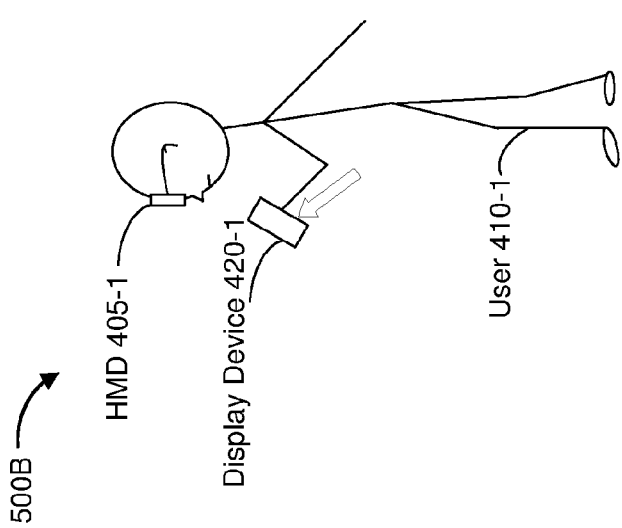
Figure 5E:
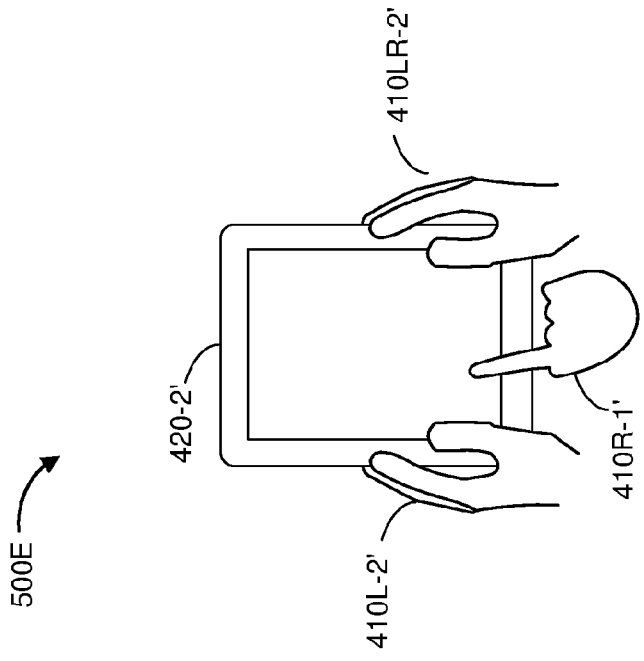
Figure 5D:
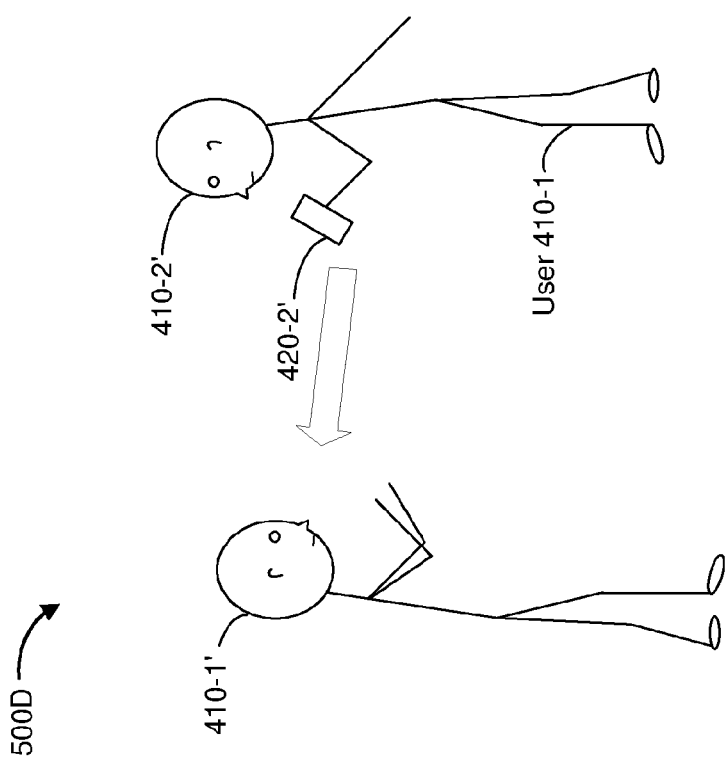

In another example, in the exemplary setting 500D of FIG. 5D, a first avatar 410-1' representing the first user 410-1 is shown in the SR setting 500. The first avatar 410-1' is within a degree of similarity to body poses of the first user 410-1 at a real-world scene. Further, the SR setting 500D includes an SR representation of the second display device 420-2'. Additionally, the SR setting 500D includes a second avatar 410-2' corresponding to the second user 410-2. The second avatar 410-2' is within a degree of similarity to body poses of the second user 410-2 at a real-world scene. As shown in FIG. 5D, the second user as represented by the second avatar 410-2' initially holds the second display device as represented by the SR representation of the second display device 420-2' close to his body. The second user then moves the second display device away from his body or tilts the second display device. As a result of the gesture input, the collaboration mode is entered.

In the collaboration mode, both the first user and the second user can view and interact with the second display device in the SR setting. For example, as shown in the exemplary SR setting 500E of FIG. 5E, the hands 410L-2' and 410R-2' of the second user are displayed next to the SR representation of the second display device 420-2', so that movements of the second display device by the hands of the second user in real-world can be rendered in the SR setting 500E. Further, as shown in FIG. 5E, the SR setting 500E also includes the right hand 410R-1' of the first user, so that movements of the right hand of the first user in real-world, e.g., tapping, pinching, flicking, swiping, grabbing, pressing, can be detected and emulated in the SR setting 500E. The emulated gestures of the right hand of the first user are then displayed in the SR setting 500E to show the interaction with the SR representation of the second display device 420-2'. Further, the input directives associated with the emulated gestures are executed on the second display device, as described above with reference to FIG. 4.

It should be noted that though FIGS. 5A-5E illustrate exemplary gesture inputs that trigger the collaboration mode, other types of inputs can be used as indicators for triggering the collaboration mode. Such inputs include, but not limited to, voice commands and/or touch inputs. Further, although FIGS. 5A-5E illustrate examples of gesture inputs that trigger the sharing of a physical device between two users, the physical device can be shared among more than two users. For example, in response to obtaining a gesture input towards a group of students, a professor can share the control of a device with the group.

FIGS. 6A-6D illustrate scaling an SR representation of a display device in an example of an SR setting 600 in accordance with some implementations. In some implementations, the SR setting 600 is based on a real environment surveyed by a scene camera of a device. In various implementations, the scene camera is part of a device that is associated with (e.g., worn by) a user and includes one or more displays that display the SR setting 600. Thus, in various implementations, the user is physically present in the environment. In various implementations, the scene camera is part of remote device (such as a drone or robotic) that transmits pass-through image data from the scene camera to a local device, which is worn by the user and includes a display that displays the SR setting 600. Thus, in some such implementations, the user can be physically outside the environment. In some implementations, as described above with reference to FIG. 1B, the pass-through image data for rendering the SR setting 600 includes an avatar that is within a degree of similarity to the body pose of a person at a real-world scene. In FIGS. 6A-6D, the SR setting 600 includes a user 605, which can be an avatar representing a person or a real person in a real environment.

In FIG. 6A, the pass-through image data characterizes the user 605 standing in a room with a TV 610 on a wall for displaying TV programs, e.g., news and/or stock market analysis. The room also includes furniture 615 next to the user 605. In some implementations, in response to obtaining the gesture input from a different user (not shown), e.g., a remote user holding a display device, an SR representation of the display device is rendered in the SR setting 600.

Figure 6B:
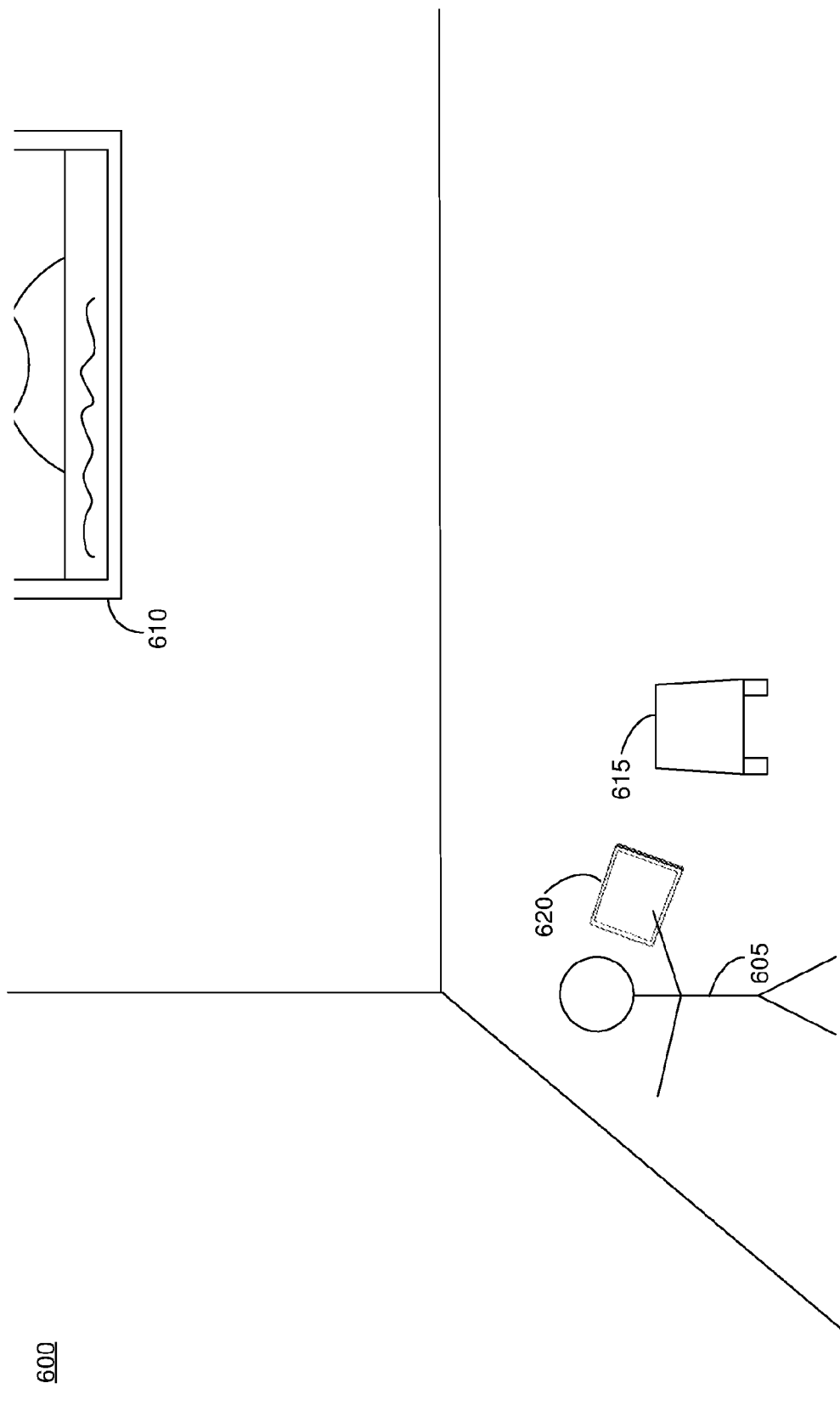

For example, as shown in FIG. 6B, the SR representation of the display device is a computing device 620 in front of the user 605 in the SR setting 600. In some implementations, the computing device 620 is a true scale 3D representation of the display device, e.g., a true scale 3D representation of a tablet computer. In some implementations, the user 605 can move the computing device 620 around in the SR setting 600, place the computing device 620 on the furniture 615, push a button of the computing device 620, and/or tap on the computing device 620 etc. These interactions of the user 605 with the computing device 620 are associated with input directives intended for the interactions with the remote displayable device. In some implementations, the SR device associated with the user 605 obtains these input directives (e.g., using IMU, hand tracking, and/or camera to track hand gestures and/or body poses) and transmits input messages encapsulating the input directives for execution on the remote display device, as described above with reference to FIG. 4.

In some implementations, the SR representation of the remote display device is not limited to true scale 3D rendering of the remote display device. In order to facilitate the viewing and interactivity, in some implementations, the SR representation of the remote display device is scalable. For instance, in FIG. 6C, the SR representation of the tablet computer is scaled to fit the TV 610 and the user interface of the remote tablet computer is displayed in the TV 610. The user 605 can then walk around the furniture 615 and touch the TV 610 in order to enter input directives, e.g., selecting the shopping affordance. In another example, in FIG. 6D, the display of the remote tablet computer is projected on the wall next to the TV 610 and scaled to be larger than the TV 610. The user 605 can then select an affordance (e.g., the camera affordance) projected on the wall from distance in the SR setting 600.

In some implementations, the remote display device executes the input directives included in the input message in accordance with whether a user is permitted to perform an operation. In some implementations, the permissions and/or policies specify access rights of a user to one or more resources. For example, the policies can specify whether the second user has access to an affordance or whether the second user can interact with an affordance. In some implementations, the input message from the second SR device includes an identity of the second user and operations to be performed on the first display device. As such, upon receiving the input message, the first display device looks up the second user's access rights and determines whether the second user is permitted to perform the operations specified in the input message.

Figure 7:
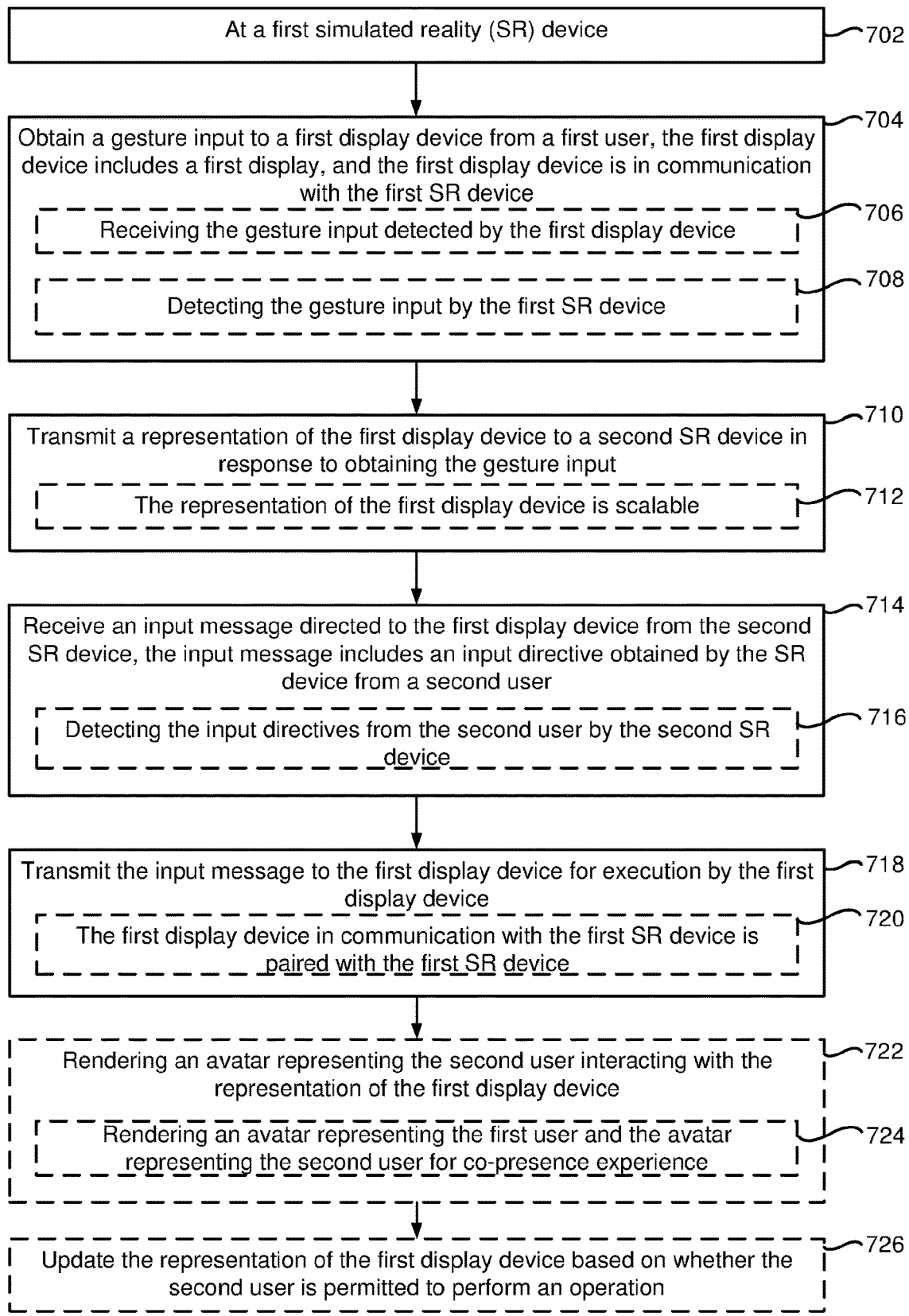
FIG. 7 is a flowchart representation of a method of display device sharing in accordance with some implementations.

FIG. 7 is a flowchart representation of a method 700 of display device sharing in SR setting in accordance with some implementations. In various implementations, the method 700 is performed, as represented by block 702, at a first SR device with one or more processors and a non-transitory memory. In some implementations, the first device includes a head-mounted device, a mobile phone, a tablet, and/or a drone. In some implementations, the method 700 is performed by processing logic, including hardware, firmware, software, or a combination thereof. In some implementations, the method 700 is performed by a processor and/or a controller (e.g., the controller 102 in FIG. 1A) executing instructions (e.g., code) stored in a non-transitory computer-readable medium (e.g., a memory). Briefly, in some circumstances, the method 700 includes: obtaining a gesture input to a first display device from a first user, wherein the first display device includes a first display, and the first display device is in communication with the first SR device; transmitting an SR representation of the first display device to a second SR device in response to obtaining the gesture input; receiving an input message directed to the first display device from the second SR device, wherein the input message includes an input directive obtained by the second SR device from a second user; and transmitting the input message to the first display device for execution by the first display device.

The method 700 begins, in block 704, with the first SR device obtaining a gesture input to a first display device from a first user. For example, as shown in FIG. 5B, the exemplary gesture input includes the user 410-1 raising his arm and supporting the display device 420-1 on his palm. In another example, as shown in FIG. 5D, the exemplary gesture input includes the second user, as represented by the second avatar 410-2', tilting the display device represented by 420-2' and moving the display device closer to the first user represented by the first avatar 410-1'.

In some implementations, the first display device includes a first display, and the first display device that is in communication with the first SR device is paired with the first SR device. As such, inputs (e.g., the gesture input) detected by the first display device are communicated to the first SR device through the pairing in accordance with some implementations. Accordingly, as represented by block 706, the first SR device receives the gesture input detected by the first display device through the pairing in accordance with some implementations.

For example, the first SR device can receive an indicator of the gesture input from the first display device, where the first display device receives the gesture input (e.g., the gesture input as shown in FIGS. 5B and 5D) from the first user and sends the indicator of the gesture input to the first SR device. In some implementations, the indicator of the gesture input triggers the first SR device to enter a collaboration mode, so that both the first user and the second user can view and interact with the first display device, as shown in FIGS. 5C and 5E. In some implementations, instead of relying on the first display device to detect the gesture input, as represented by block 708, the first SR device detects the gesture input. For example, utilizing the camera and/or IMU associated the first SR device, the first SR device can detect a movement of the first user holding the first display device and derive the gesture input based on the movement of the first user.

Figure 6C:
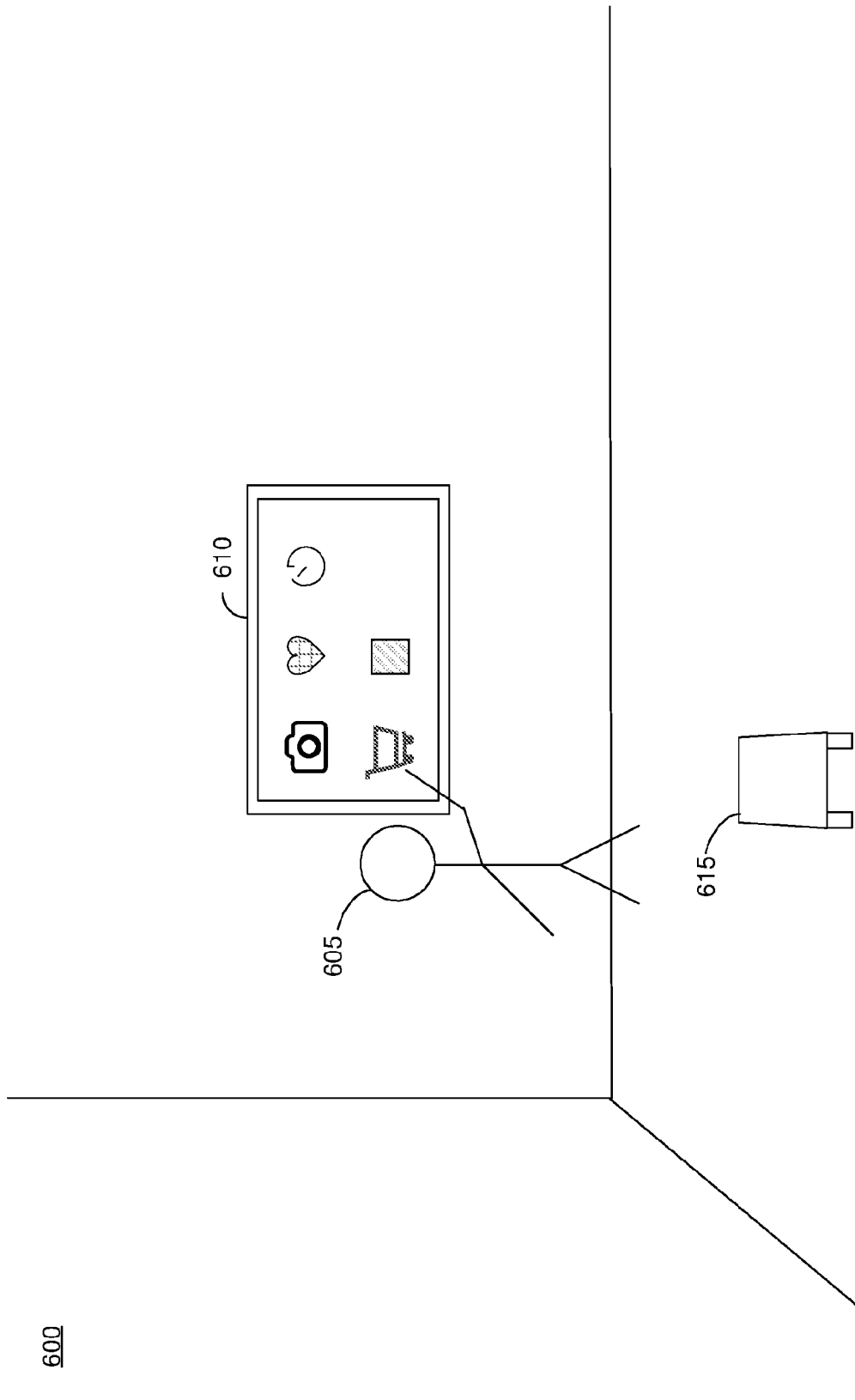
Figure 6D:
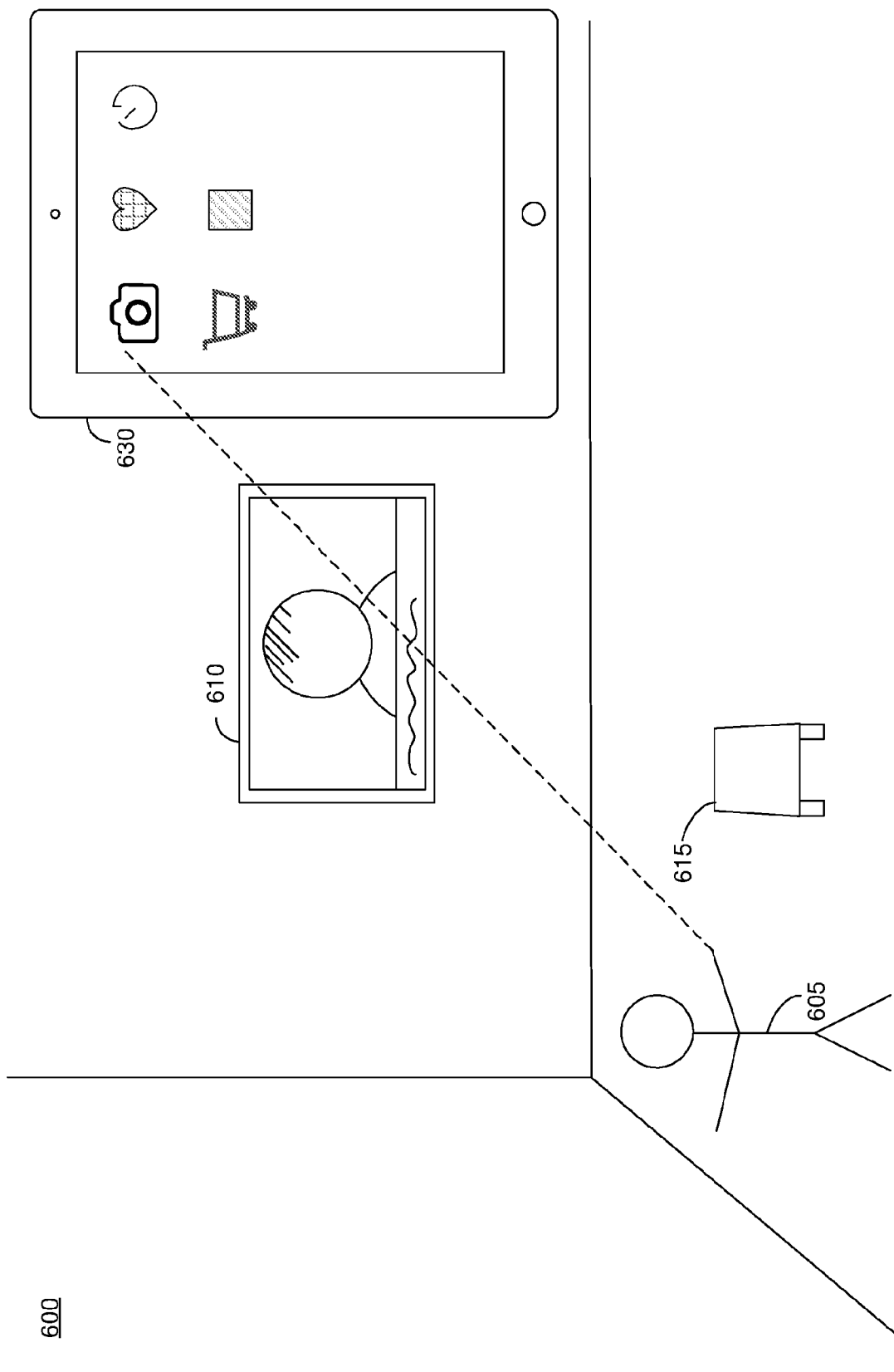

The method 700 continues, in block 710, with the first SR device transmitting an SR representation of the first display device to a second SR device in response to obtaining the gesture input. In some implementations, the SR representation of the first display device is streamed in real time (e.g., without substantial delay) to the shared SR setting. In the shared SR setting, the SR representation of the first display device can be live images of the first display of the first display device and/or a rendering (e.g., 3D rendering) of the first display device. For example, in the example environment as shown in FIG. 6B, the SR representation 620 is a true scale 3D rendering of the display device floating in the air. In some implementations, as represented by block 712, the SR representation of the first display device is scalable. For example, in FIG. 6C, the SR representation of the first display device is scaled to fit the TV 610, which may have a different dimension than the first display device. In yet another example, as shown in FIG. 6D, the SR representation 630 is projected on a surface and scaled to a large size for viewing and interactivity.

Still referring to FIG. 7, as represented by block 714, the method 700 continues, with the first SR device receiving an input message directed to the first display device from the second SR device, where the input message includes an input directive obtained by the second SR device from a second user. In some implementations, the input directive includes hand and/or body movements, which signal intended inputs to the first display device. In other words, the input directive is associated with changes in spatial and/or angular coordinates of body parts/joints of the second user. In such implementations, the hand and/or body movements are detected by the second SR device (e.g., using camera, hand tracking, and/or IMU associated with the second SR device) and directed to the SR representation of the first display device. In some implementations, as represented by block 716, in response to detecting such input directives, the second SR device composes the input message based on the input directives.

For instance, based on the absolute and/or relative position of the SR representation of the first display device and/or the spatial and/or angular coordinates of body parts/joints, the second SR device calculates the input location(s) on the display SR representation and determines the corresponding input directives (e.g., tapping, pressing, sliding etc.) directed at the input location(s). Based on the input location(s) and the movements associated with the input directives, the second SR device composes (e.g., generates) the input message, where the input message specifies operations (e.g., tapping on a shopping affordance indicates a shopping operation) intended to be implemented through the input directives. In FIGS. 6B-6D, for instance, the arm, hand, and/or finger movements of the user 605 interacting with the SR representation of the display device are input directives detected by the IMU, hand tracking, and/or camera associated with the SR device worn by the user 605. The interactions of the user 605 with the SR representation, e.g., selecting the shopping affordance in FIG. 6C or selecting the camera affordance in FIG. 6D, are included in the input messages to be transmitted to the remote display device for execution.

Referring back to FIG. 7, the method 700 continues, in block 718, with the first SR device transmitting the input message to the first display device for execution by the first display device. In some implementations, as represented by block 720, the first display device is paired with the first SR device through wired or wireless connection, and the SR representation of the first display device is transmitted to the second SR device through a peer-to-peer connection. As such, the input message from the second SR device is communicated to the first display device via the first SR device for execution on the first display device.

In some implementations, as represented by block 722, the method 700 further includes rendering an avatar representing the second user and the SR representation of the first display device, so that the interaction of the second user with the first display device can be seen in the SR setting. In such implementations, the body poses and/or hand gestures of the avatar representing the second user are updated in the SR setting based on the input message. Further based on the operations specified in the input message, the first display device performs the operations and provides updated SR representation of the first display device reflecting updated user interfaces and/or the operational status of the first display device. As such, the interactivity of the second user with the display device held by the first user is rendered by displaying the avatar representing the second user proximate to the SR representation of the display device.

In some implementations, as represented by block 724, in order to provide a co-presence experience, the method 700 further includes rendering, in a shared SR setting, an avatar representing the first user and the avatar representing the second user along with the representation of the first display device. As such, the avatar representing the first user is rendered proximate to the avatar representing the second user irrespective of a physical distance between the first user and the second user. For example, as shown in FIG. 5A, the first user 410-1 and the second user 410-2 are far away from each other in real-world. In order to create a co-presence experience, as shown in FIG. 5D, the avatar 410-1' representing the first user 410-1 is composited into the SR setting and rendered next to the avatar 410-2' representing the second user 410-2. The rendering provides the appearance that the first user 410-1 is adjacent to the second user 410-2.

In some implementations, as described above, the input message includes an identity of the second user and operations to be performed on the first display device. In such implementations, the method 700 further includes receiving an updated SR representation of the first display device from the first display device based on whether the second user is permitted to perform an operation. In some implementations, the updated SR representation of the first display device is generated by the first display device based at least in part on one or more of the identity of the second user, the operations to be performed on the first display device, or a policies. For example, the policies specify whether to allow or disallow certain types of interactions or applications. As such, the second user is restricted to interact with a subset of applications and a subset of functions on the first display device. Accordingly, in accordance with a determination that the second user is not permitted to perform the operation on the first display device, the operation is not performed. On the other hand, in accordance with a determination that the second user is permitted to perform the operation on the first display device, the operation is performed.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a first electronic device including one or more processors and a non-transitory memory:
    obtaining a gesture input directed to a first display device from a first user, wherein the first display device includes a first display, and the first display device is in communication with the first electronic device;
    transmitting a 3D representation of the first display device to a second electronic device responsive to obtaining the gesture input;
    receiving an input message directed to the 3D representation of the first display device from the second electronic device, wherein the input message includes an input directive obtained by the second electronic device from a second user;
    transmitting the input message to the first display device for execution by the first display device;
    rendering an avatar representing the second user and the 3D representation of the first display device;
    updating at least one of body poses or hand gestures of the avatar based on the input message;
    obtaining an updated 3D representation of the first display device; and
    rendering the avatar with updates and the updated 3D representation of the first display device.

2. The method of claim 1, further comprising obtaining the 3D representation of the first display device using wired or wireless communication with the first display device.

3. The method of claim 1, further comprising obtaining the 3D representation of the first display device using one or more cameras of the first electronic device.

4. The method of claim 1, wherein obtaining the gesture input directed to the first display device from the first user includes:
    receiving an indicator of the gesture input from the first display device, wherein the gesture input is received by the first display device from the first user.

5. The method of claim 1, wherein obtaining the gesture input directed to the first display device from the first user includes:
    detecting a movement of the first user holding the first display device; and
    deriving the gesture input based on the movement of the first user.

6. The method of claim 1, wherein the 3D representation of the first display device includes a portion of content displayed on the first display.

7. The method of claim 1, wherein the 3D representation of the first display device is scalable to a second size and proportion different from a first size and proportion associated with the first display device.

8. The method of claim 1, wherein:
    the input directive is associated with movements by the second user detected by the second electronic device; and
    the movements are directed to the 3D representation of the first display device.

9. The method of claim 1, wherein the first display device is paired with the first electronic device for communication through a peer-to-peer connection, and wherein transmitting the 3D representation of the first display device to the second electronic device responsive to obtaining the gesture input comprises transmitting the 3D representation of the first display device to the second electronic device through a peer-to-peer connection.

10. The method of claim 1, further comprising:
    rendering, in a shared simulated reality (SR) setting, an avatar representing the first user and the avatar representing the second user along with the 3D representation of the first display device.

11. The method of claim 1, wherein the input message includes an identity of the second user and an operation to be performed on the first display device, and the method further comprising:
    determining, using the first display device and based at least in part on the identity of the second user, whether the second user is permitted to perform the operation on the first display device; and
    in accordance with a determination that the second user is not permitted to perform the operation on the first display device, forgoing performance of the operation.

12. The method of claim 11, further comprising in accordance with a determination that the second user is permitted to perform the operation on the first display device, performing the operation.

13. The method of claim 1, wherein the first electronic device includes at least one of a head-mounted device, a mobile phone, a tablet, a webcam, or a kiosk.

14. A first electronic device comprising:
    one or more processors;
    a non-transitory memory; and
    one or more programs stored in the non-transitory memory, which, when executed by the one or more processors, cause the first electronic device to:
    obtain a gesture input to a first display device from a first user, wherein the first display device includes a first display, and the first display device is in communication with the first electronic device;
    transmit a 3D representation of the first display device to a second electronic device in response to obtaining the gesture input;
    receive an input message directed to the 3D representation of the first display device from the second electronic device, wherein the input message includes an input directive obtained by the second electronic device from a second user;

transmit the input message to the first display device for execution by the first display device;
render an avatar representing the second user and the 3D representation of the first display device;
update at least one of body poses or hand gestures of the avatar based on the input message;
obtain an updated 3D representation of the first display device; and
render the updated avatar and the updated 3D representation of the first display device.

15. The first electronic device of claim 14, wherein obtaining the gesture input directed to the first display device from the first user includes:
receiving an indicator of the gesture input from the first display device, wherein the gesture input is received by the first display device from the first user.

16. The first electronic device of claim 14, wherein obtaining the gesture input directed to the first display device from the first user includes:
detecting a movement of the first user holding the first display device; and
deriving the gesture input based on the movement of the first user.

17. A non-transitory memory storing one or more programs, which, when executed by the one or more processors of a first electronic device, cause the first electronic device to:
obtain a gesture input to a first display device from a first user, wherein the first display device includes a first display, and the first display device is in communication with the first electronic device;
transmit a 3D representation of the first display device to a second electronic device in response to obtaining the gesture input;
receive an input message directed to the 3D representation of the first display device from the second electronic device, wherein the input message includes an input directive obtained by the second electronic device from a second user;
transmit the input message to the first display device for execution by the first display device;
render an avatar representing the second user and the 3D representation of the first display device;
update at least one of body poses or hand gestures of the avatar based on the input message;
obtain an updated 3D representation of the first display device; and
render the updated avatar and the updated 3D representation of the first display device.

18. The non-transitory memory of claim 17, wherein obtaining the gesture input directed to the first display device from the first user includes:
receiving an indicator of the gesture input from the first display device, wherein the gesture input is received by the first display device from the first user.

19. The non-transitory memory of claim 17, wherein obtaining the gesture input directed to the first display device from the first user includes:
detecting a movement of the first user holding the first display device; and
deriving the gesture input based on the movement of the first user.

20. The first electronic device of claim 14, wherein the 3D representation of the first display device includes a portion of content displayed on the first display.

21. The first electronic device of claim 14, wherein:
the input directive is associated with movements by the second user detected by the second electronic device; and
the movements are directed to the 3D representation of the first display device.

22. The first electronic device of claim 14, wherein:
the input message includes an identity of the second user and an operation to be performed on the first display device; and
the one or more programs, which, when executed by the one or more processors, cause the first electronic device to:
determine, using the first display device and based at least in part on the identity of the second user, whether the second user is permitted to perform the operation on the first display device;
in accordance with a determination that the second user is not permitted to perform the operation on the first display device, forgo performance of the operation; and
in accordance with a determination that the second user is permitted to perform the operation on the first display device, perform the operation.

23. The non-transitory memory of claim 17, wherein the 3D representation of the first display device includes a portion of content displayed on the first display.

24. The non-transitory memory of claim 17, wherein:
the input directive is associated with movements by the second user detected by the second electronic device; and
the movements are directed to the 3D representation of the first display device.

25. The non-transitory memory of claim 17, wherein:
the input message includes an identity of the second user and an operation to be performed on the first display device; and
the one or more programs, which, when executed by the one or more processors of the first electronic device, cause the first electronic device to:
determine, using the first display device and based at least in part on the identity of the second user, whether the second user is permitted to perform the operation on the first display device;
in accordance with a determination that the second user is not permitted to perform the operation on the first display device, forgo performance of the operation; and
in accordance with a determination that the second user is permitted to perform the operation on the first display device, perform the operation.

26. The non-transitory memory of claim 17, wherein the one or more programs, which, when executed by the one or more processors, further cause the first electronic device to:
obtain the 3D representation of the first display device using wired or wireless communication with the first display device.

* * * * *